United States Patent
Kaida

(10) Patent No.: US 8,294,661 B2
(45) Date of Patent: Oct. 23, 2012

(54) CONTROLLING IMAGE DISPLAY ACCORDING TO A HIGH-LUMINANCE REFERENCE VALUE AND A LOW-LUMINANCE REFERENCE VALUE

(75) Inventor: Shunsuke Kaida, Tokyo (JP)

(73) Assignee: Sony Corporation (JP)

( * ) Notice: Subject to any disclaimer, the term of this patent is extended or adjusted under 35 U.S.C. 154(b) by 519 days.

(21) Appl. No.: 12/462,349

(22) Filed: Aug. 3, 2009

(65) Prior Publication Data

US 2010/0039369 A1 Feb. 18, 2010

(30) Foreign Application Priority Data

Aug. 7, 2008 (JP) ................ P2008-203882

(51) Int. Cl.
- G09G 3/36 (2006.01)
- H04N 5/14 (2006.01)
- G06K 9/00 (2006.01)

(52) U.S. Cl. ........ 345/102; 348/671; 348/672; 382/168; 382/169; 382/170; 382/171; 382/172

(58) Field of Classification Search ............. 345/102
See application file for complete search history.

(56) References Cited

U.S. PATENT DOCUMENTS

| | | | |
|---|---|---|---|
| 5,294,986 A * | 3/1994 | Tsuji et al. | 348/672 |
| 5,517,333 A * | 5/1996 | Tamura et al. | 358/518 |
| 5,905,817 A * | 5/1999 | Matama | 382/260 |
| 6,583,820 B1 * | 6/2003 | Hung | 348/362 |
| 7,167,597 B2 * | 1/2007 | Matsushima | 382/274 |
| 2003/0095192 A1 * | 5/2003 | Horiuchi | 348/222.1 |
| 2004/0051851 A1 * | 3/2004 | Stanton et al. | 353/84 |
| 2007/0291053 A1 * | 12/2007 | Kida et al. | 345/690 |

FOREIGN PATENT DOCUMENTS

| | | |
|---|---|---|
| JP | 2002-268116 A | 9/2002 |
| JP | 2002369074 A | 12/2002 |
| WO | 2008032632 A1 | 3/2008 |

* cited by examiner

*Primary Examiner* — Alexander S Beck
*Assistant Examiner* — Karin Kiyabu
(74) *Attorney, Agent, or Firm* — Lerner, David, Littenberg, Krumholz & Mentlik, LLP

(57) ABSTRACT

A projection display unit includes: a light modulation panel which modulates light from a light source in accordance with a given image signal; an iris diaphragm which regulates, by changing a diaphragm diameter, a transmission amount of light modulated by the light modulation panel; a histogram creator which creates a histogram of a luminance signal distribution of the image signal; a histogram analyzer which analyzes the created histogram to specify high-luminance and low-luminance reference values in the histogram; a reference value derivation section which derives a single reference value from both the high-luminance reference value and the low-luminance reference value specified by the histogram analyzer; and an iris controller which determines the diaphragm diameter of the iris diaphragm for the light modulated by the light modulation panel in accordance with the image signal on the basis of the single reference value specified by the reference value derivation section.

4 Claims, 4 Drawing Sheets

FIG. 2

| INDEX WHITE | | | | | | | | |
|---|---|---|---|---|---|---|---|---|
| | 0 | 1 | 2 | ... | 29 | 30 | 31 | |
| 0 | 0 | 1 | 2 | | 29 | 30 | 31 | |
| 1 | 0 | 1 | 2 | | 29 | 30 | 31 | |
| 2 | | 2 | 3 | | 30 | 31 | 32 | |
| 3 | | | 4 | | 31 | 32 | 33 | |
| ... | | | | | | | | |
| 29 | | | | | 58 | 59 | 60 | |
| 30 | | | | | | 60 | 61 | |
| 31 | | | | | | | 62 | |
| INDEX BLACK | | | | | | | | |

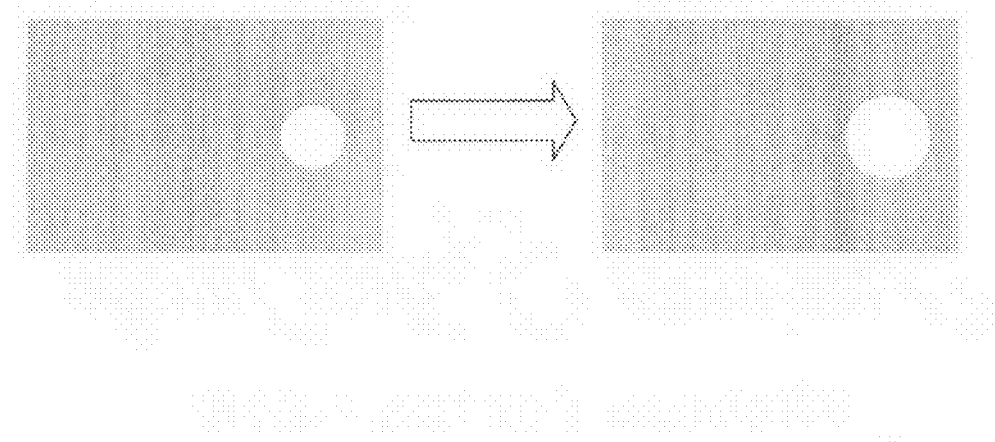
FIG. 4A    FIG. 4B
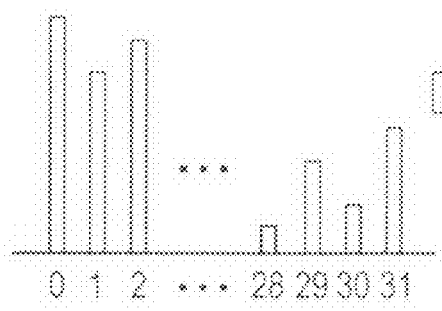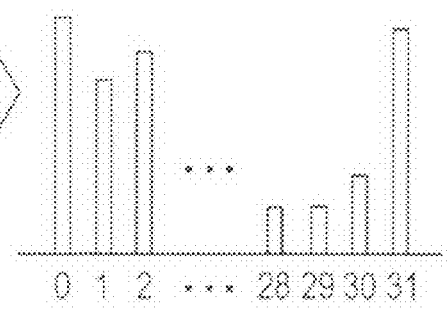
FIG. 4C    FIG. 4D

CONTROLLING IMAGE DISPLAY ACCORDING TO A HIGH-LUMINANCE REFERENCE VALUE AND A LOW-LUMINANCE REFERENCE VALUE

CROSS-REFERENCE TO RELATED APPLICATION

The present application claims priority from Japanese Patent Application No. JP 2008-203882 filed in the Japanese Patent Office on Aug. 7, 2008, the entire content of which is incorporated herein by reference.

BACKGROUND OF THE INVENTION

1. Field of the Invention

The present invention relates to a projection display unit for displaying a projected image and to a method for controlling image display when displaying a projected image.

2. Description of the Related Art

A liquid crystal projector is widely known as a projection display unit for displaying projected images. The liquid crystal projector modulates light from a light source in a liquid crystal panel to create an optical image in accordance with image signals and displays an enlarged optical image on a screen via a projector lens. An iris diaphragm mechanism (hereinafter, simply referred to as an "iris diaphragm") is provided between the liquid crystal panel and a projector lens. A transmission amount of light after being modulated in the liquid crystal panel is regulated in accordance with a diaphragm diameter of the iris diaphragm. In this manner, the luminance of the image projected on the screen may be changed.

The luminance of a projected image may be controlled through analysis of a histogram of a luminance signal distribution of image signals for an image to be projected. In particular, a frequency count is accumulated from either a high-luminance end or a low-luminance end of the created histogram. A class of the histogram where the accumulated frequency class exceeds a threshold is detected. A diaphragm diameter of the iris diaphragm is determined by using a value uniformly specified from the class. In particular, the diaphragm diameter of the iris diaphragm which may directly affect the luminance of the projected image is determined on the basis of a search result from either the high-luminance end or the low-luminance end of the histogram in order to control the luminance of the projected image (for example, see Japanese Unexamined Patent Application Publication No. 2002-268116).

SUMMARY OF THE INVENTION

In the above-described control method of the related art, however, the iris diaphragm may possibly be caused to operate unnaturally and thus the luminance of the projected image may not be controlled appropriately.

Suppose, for example, that a generally dark-toned image with an extremely bright spot is first displayed and then an image with the bright spot substantially increased or decreased in size is displayed. In such a case, the diaphragm diameter of the iris diaphragm should not be changed considerably if the image still keeps a generally dark tone irrespective of increase or decrease in size of the bright spot. If, however, the diaphragm diameter of the iris diaphragm is determined based on a search result at the high-luminance end of the histogram, a considerable change in the diaphragm diameter of the iris diaphragm in accordance with the significantly increased or decreased area of the bright spot may have an adverse effect. That is, the iris diaphragm behaves unnaturally to considerably change the luminance of the still generally dark-toned projected image.

It is therefore desirable to provide a projection display unit in which an iris diaphragm behaves naturally in accordance with a projected image to be displayed, thereby appropriately controlling the luminance of the projected image. It is also desirable to provide a method for controlling image display.

There is a need for a projection display unit including: a light modulation panel which modulates light from a light source in accordance with a given image signal; an iris diaphragm which regulates, by changing a diaphragm diameter, a transmission amount of light modulated by the light modulation panel; a histogram creator which creates a histogram of a luminance signal distribution of the image signal; a histogram analyzer which analyzes the histogram created by the histogram creator to specify a high-luminance reference value and a low-luminance reference value in the histogram; a reference value derivation section which derives a single reference value from both the high-luminance reference value and the low-luminance reference value specified by the histogram analyzer; and an iris controller which determines the diaphragm diameter of the iris diaphragm for the light modulated by the light modulation panel in accordance with the image signal on the basis of the single reference value specified by the reference value derivation section.

In the thus-configured projection display unit, the histogram creator creates a histogram, which will be analyzed by the histogram analyzer to specify a high-luminance reference value and a low-luminance reference value. The high-luminance reference value is obtained by accumulating the frequency count at the high-luminance end in the histogram or by comparison with a high-luminance threshold. The low-luminance reference value is obtained by accumulating the frequency count at the low-luminance end in the histogram or by comparison with a low-luminance threshold. The reference value derivation section derives a single reference value from the specified high-luminance reference value and the low-luminance reference value. The iris controller determines a diaphragm diameter of the iris diaphragm based on the single reference value specified by the reference value derivation section. Accordingly, both the high-luminance reference value and the low-luminance reference value, i.e., both luminance signal distribution of the high-luminance end and luminance signal distribution of the low-luminance end in the histogram, are reflected in the determined diaphragm diameter of the iris diaphragm. That is, the diaphragm diameter of the iris diaphragm is determined according to not either but both the high-luminance end and the low-luminance end.

In the embodiments of the invention, since the diaphragm diameter of the iris diaphragm is determined according to the luminance signal distribution at both the high-luminance end and the low-luminance end, the iris diaphragm may behave naturally according to the projected image to be displayed. For example, for a generally dark-toned image with a bright spot that may considerably increase or decrease in size, behavior of the iris diaphragm may be controlled so that the diaphragm diameter is not changed unless the image not longer keeps a generally dark tone. Accordingly, the iris diaphragm may be controlled automatically while eliminating unnatural behavior of the iris diaphragm, thereby appropriately controlling the luminance of the projected image.

BRIEF DESCRIPTION OF THE DRAWINGS

FIG. 2 illustrates an exemplary two-dimensional matrix table used in the projection display unit of FIG. 1;

FIGS. 4A to 4D each illustrate exemplary iris control by the method for controlling the image display according to the embodiment of the invention.

DESCRIPTION OF THE PREFERRED EMBODIMENTS

Figure 1:
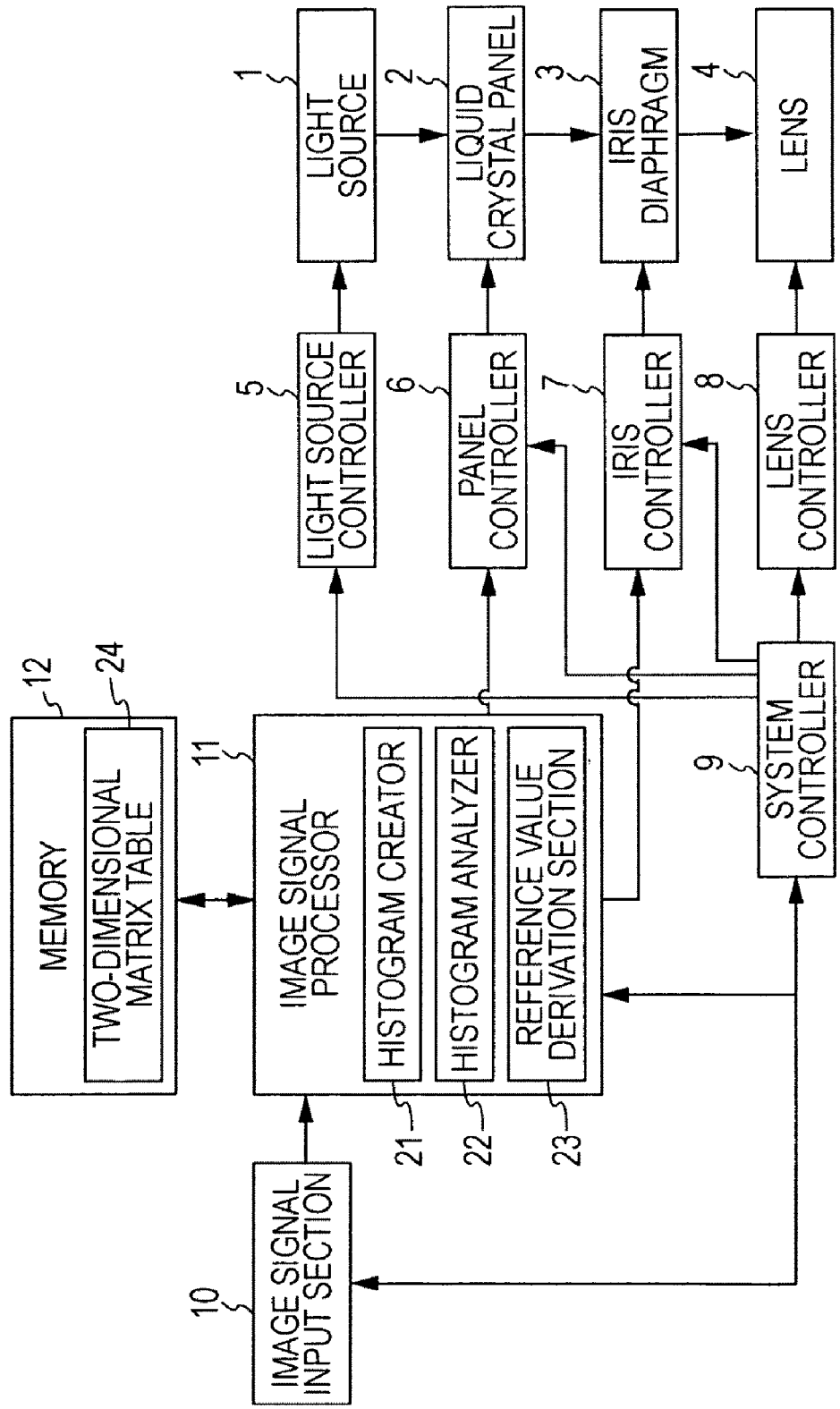
FIG. 1 is a functional block diagram illustrating an exemplary schematic structure of the projection display unit according to an embodiment of the invention.

Referring now to the drawings, a projection display unit and a method for controlling image display according to the embodiment of the invention will be described.

Projection Display Unit

First, a schematic structure of the projection display unit according to an embodiment of the invention will be described.

FIG. 1 is a functional block diagram illustrating an exemplary schematic structure of the projection display unit according to an embodiment of the invention.

As shown in FIG. 1, the projection display unit includes a light source 1, a liquid crystal panel 2, an iris diaphragm 3 and a lens 4. The projection display unit modulates light emitted from the light source 1 using the liquid crystal panel 2, regulates a transmission amount of the modulated light passing through the iris diaphragm 3 by changing the diaphragm diameter, and displays an optical image created by the regulated amount of light passing through the iris diaphragm on a screen via the lens 4 which provides enlarged projection. The light source 1, the liquid crystal panel 2, the iris diaphragm 3 and the lens 4 may be implemented by the existing art and thus detailed description thereof (e.g., detailed description of mechanisms and the like) will be omitted.

The projection display unit also includes a light source controller 5, a panel controller 6, an iris controller 7, a lens controller 8 and a system controller 9 for displaying an image on a screen by using the light source 1, the liquid crystal panel 2, the iris diaphragm 3 and the lens 4.

The light source controller 5 controls light emission of the light source 1.

The panel controller 6 controls light modulation of the liquid crystal panel 2.

The iris controller 7 controls a diaphragm-diameter-changing operation of the iris diaphragm 3. As will be described in detail later, the iris controller 7 determines the diaphragm diameter of the iris diaphragm 3 for light transmission according in accordance with instructions from the image signal processor 11.

The lens controller 8 controls optical image projection of the lens 4.

The system controller 9 controls the entire operation of the projection display unit.

The projection display unit also includes an image signal input section 10, an image signal processor 11 and a memory 12.

The image signal input section 10 receives from the outside an image signal for an image to be displayed on the screen.

An external device (not shown) for supplying the image signal is connected to the image signal input section 10.

The image signal processor 11 processes the image signal received by the image signal input section 10. This process is necessary for displaying an image according to the image signal.

The memory 12 retains information, including various programs and parameter data, necessary for image signal processing performed by the image signal processor 11.

The memory 12 also serves as a work area for the image signal processing performed by the image signal processor 11.

The image signal processor 11 functions as a histogram creator 21, a histogram analyzer 22 or a reference value derivation section 23 depending on a process to be executed on the image signal.

The histogram creator 21 creates a histogram of the luminance signal distribution of the image signal to be processed. A histogram may be created by any method of the existing art and is not particularly limited.

The histogram analyzer 22 analyzes the histogram created by the histogram creator 21 to specify both the high-luminance reference value and the low-luminance reference value in the histogram. The high-luminance reference value is obtained by accumulating frequencies from the high-luminance end of the histogram or by comparison with a high-luminance threshold. The low-luminance reference value is obtained by accumulating frequencies from the low-luminance end of the histogram or by comparison with a low-luminance threshold. The high-luminance threshold and the low-luminance threshold may be determined in advance and kept in the memory 12.

The reference value derivation section 23 derives a single reference value from the high-luminance reference value and the low-luminance reference value specified by the histogram analyzer 22. The reference value derivation section 23 presents the derived single reference value to the iris controller 7 which then determines the diaphragm diameter of the iris diaphragm 3.

Since the image signal processor 11 functions as the reference value derivation section 23, the memory 12 stores a previously established two-dimensional matrix table 24 for deriving a single reference value from both the high-luminance reference value and the low-luminance reference value. The reference value derivation section 23 derives a single reference value using the two-dimensional matrix table 24.

The two-dimensional matrix table 24 will be described below.

FIG. 2 illustrates an exemplary two-dimensional matrix table.

The two-dimensional matrix table 24 shown in FIG. 2 corresponds to a 32-level histogram created by the histogram creator 21. In the table, the high-luminance reference value (i.e., index white) is arranged in a row in thirty-two levels of "0" to "31" along the horizontal axis. The low-luminance reference value (i.e., index black) is arranged in a column in thirty-two levels of "0" to "31" along the vertical axis. When any level of the high-luminance reference value and any level of the low-luminance reference value are specified, the reference values are provided in a two-dimensional array matrix so that a single reference value may be derived therefrom.

Method for Controlling Image Display

Next, an exemplary operation of the thus-configured projection display unit, i.e., the method for controlling the image display according to an embodiment of the invention will be described.

Figure 3:
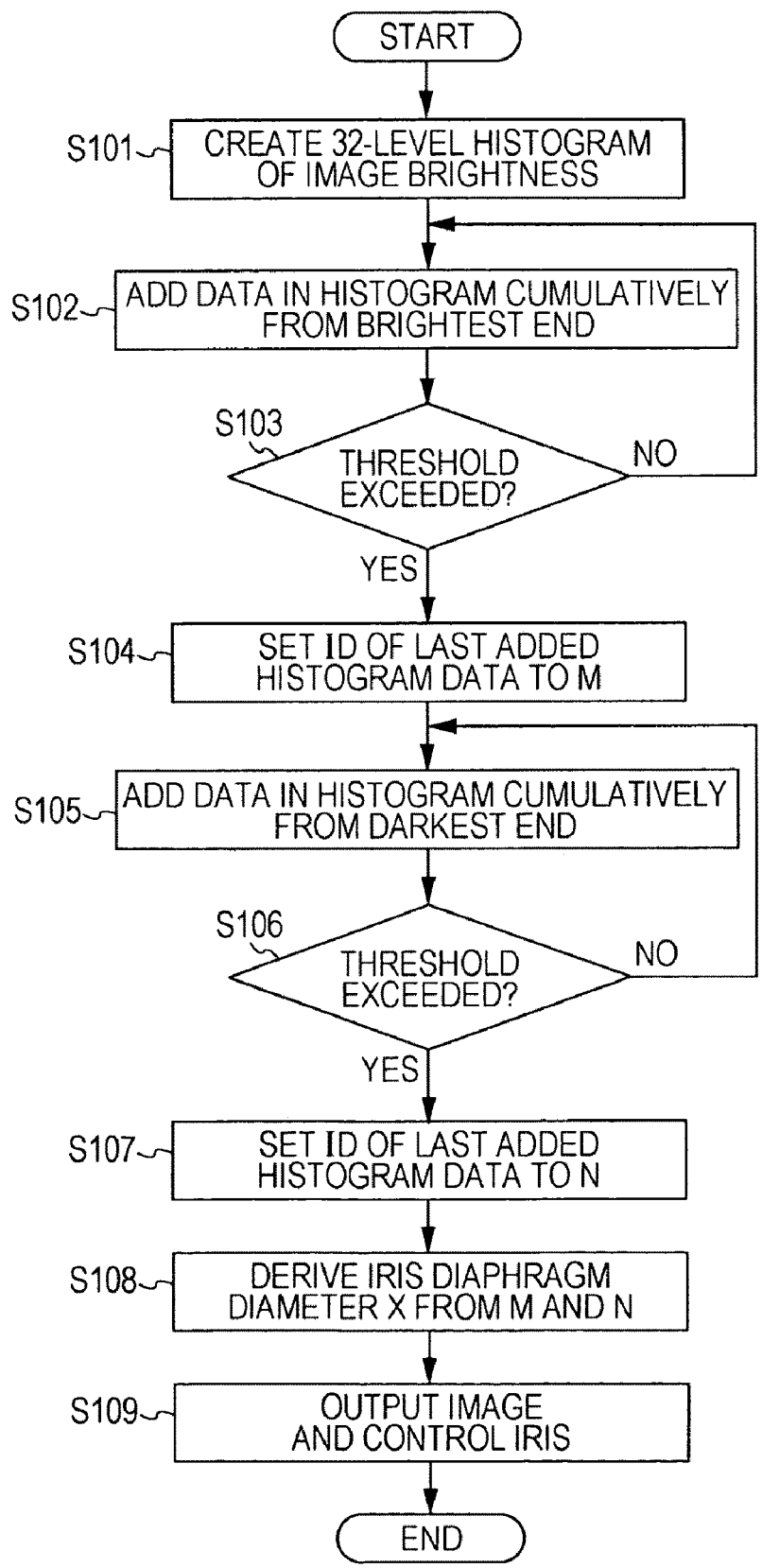
FIG. 3 is a flowchart illustrating an exemplary procedure of a method for controlling the image display according to an embodiment of the invention.

FIG. 3 is a flowchart illustrating an exemplary procedure of the method for controlling the image display according to an embodiment of the invention.

In the thus-configured projection display unit, the image signal input section 10 receives an image signal and then the histogram creator 21 of the image signal processor 11 creates a histogram of the luminance signal distribution of the image signal. In particular, the histogram creator 21 creates a histogram of the distribution of a luminance signal (brightness) for a certain unit amount of the image signal (step S101). In the histogram, for example, the horizontal axis is divided into 32 levels and the luminance frequency distribution is plotted along the vertical axis.

The histogram created by the histogram creator 21 will then be subject to analysis by the histogram analyzer 22.

The histogram analyzer 22 specifies the high-luminance reference value. In particular, the luminance frequency distribution in the histogram created by the histogram creator 21 is cumulatively added from the high-luminance end. That is, the frequency count data is added one by one from the high-luminance end of the histogram (step S102). Then, as compared with a high-luminance threshold previously set up in the added result, it is determined whether cumulated frequency count data which are added results exceed the high-luminance threshold (step S103). If the cumulated frequency count data does not exceed the high-luminance threshold, the next level of the frequency count data is added (step S102). If the cumulated frequency count data exceeds the high-luminance threshold, ID of the last added histogram data (i.e., a value of the ID which specifies the last added level of the frequency count data) is specified as a high-luminance reference value m (step S104).

The histogram analyzer 22 specifies not only the high-luminance reference value but the low-luminance reference value. In particular, the luminance frequency distribution in the histogram created by the histogram creator 21 is cumulatively added from the low-luminance end. That is, the frequency count data is added one by one from the low-luminance end of the histogram (step S105). The addition result is compared with the previously set low-luminance threshold to determine whether cumulated frequency count data which is the added result exceeds the low-luminance threshold (step S106).

If the cumulated frequency count data does not exceed the low-luminance threshold, the next level of the frequency count data is added (step S105). If the cumulated frequency count data exceeds the low-luminance threshold, ID of the last added histogram data (i.e., a value of the ID which specifies the last added level of the frequency count data) is specified as a low-luminance reference value n (step S107).

After the histogram analyzer 22 specifies both the high-luminance reference value m and the low-luminance reference value n, the reference value derivation section derives a single reference value from the high-luminance reference value m and the low-luminance reference value n using the two-dimensional matrix table 24. Then the histogram is analyzed. The reference value derivation section presents the derived single reference value to the iris controller 7, where the diaphragm diameter of the iris diaphragm 3 is determined (step S108). The single reference value corresponds uniquely to the diaphragm diameter X. The correspondence relationship is defined previously.

Accordingly, both the high-luminance reference value m and the low-luminance reference value n, i.e., both the luminance signal distribution of the high-luminance end and the luminance signal distribution of the low-luminance end of the histogram, are reflected in the thus-determined diaphragm diameter X of the iris diaphragm 3. That is, the diaphragm diameter X of the iris diaphragm 3 is determined in accordance with both, not only one, of the high-luminance end and the low-luminance end.

Then, the iris controller 7 controls the operation for changing the diaphragm diameter of the iris diaphragm 3 to the determined diaphragm diameter X (step S109). In this manner, the iris diaphragm 3 causes the light, which has been modulated by the liquid crystal panel 2 in accordance with the certain unit amount of the image signal used for the histogram creation, to pass through in an amount determined by the diaphragm diameter X.

Control Example

Next, control of the amount of light passing through by the iris diaphragm 3 in a series of procedures described above will be described with reference to an example.

FIG. 4 illustrates exemplary iris control by the method for controlling the image display according to the embodiment of the invention.

Suppose, for example, that an image shown in FIG. 4A is first displayed and then an image shown in FIG. 4B is displayed. The image shown in FIG. 4A has a generally dark tone but includes a bright spot (shown as a white circle in the drawing). The image shown in FIG. 4B has a bright spot of increased size (i.e., the white circle has increased in size) as compared with that of FIG. 4A, but is still dark in general.

The luminance signal distribution of the image shown in FIG. 4A may be represented as a histogram as shown in FIG. 4C. In this histogram, the signal frequency distribution is extremely unevenly distributed at the low-luminance side of "0" to "2" along the horizontal axis. Signals, however, are also distributed at the high-luminance side levels of "28" to "31" along the horizontal axis.

In such a histogram, in order to specify the high-luminance reference value, the frequency count data (i.e., the signal frequency distribution) is cumulatively added from the level "31" at the high-luminance end and the added result is compared with the high-luminance threshold. If the cumulated frequency count data exceeds the high-luminance threshold when the frequency count data of the level "28" is added, the level ID of the last added frequency count data, i.e., the level ID of "28" is specified as the high-luminance reference value m.

For the low-luminance reference value, the frequency count data is cumulatively added from the level "0" at the low-luminance end and the added result is compared with the low-luminance threshold. If the added result exceeds the low-luminance threshold when the frequency count data at the level "1" is added, for example, the level ID to which the last added frequency count data belongs, i.e., the level ID of "1"is specified as the low-luminance reference value n.

The luminance signal distribution of the image shown in FIG. 4B may be represented as a histogram as shown in FIG. 4D. In this histogram, as in the histogram of FIG. 4C, signal frequency distribution is extremely unevenly distributed at the low-luminance side of "0" to "2" along the horizontal axis. As compared with the histogram of FIG. 4C, however, the signal frequency distribution at the high-luminance side of "28" to "31" along the horizontal axis becomes larger.

In such a histogram, when the high-luminance reference value m and the low-luminance reference value n are specified in the same procedure as in the histogram of FIG. 4C, the specified high-luminance reference value m is "31" and the low-luminance reference value n is "2."

When the image shown in FIG. 4A is first displayed and then the image shown in FIG. 4B is displayed, if the iris diaphragm is controlled as in the related art based on histogram analysis result of either one of the high-luminance side or the low-luminance side, the following disadvantage will arise. A level ID value varies between, for example, as many as three levels of "28" to "31" at the high-luminance side. Since the image shown in FIG. 4B is still dark in general, the diameter of the iris diaphragm should not be changed. However, the diameter of the iris diaphragm is changed according to the variation of the level ID value by three levels.

In the control procedure illustrated in the present embodiment, in contrast, a single reference value is derived from both the high-luminance reference value m and the low-luminance reference value n using the previously prepared two-dimensional matrix table 24. In particular, if the high-luminance reference value m is "31" and the low-luminance reference value n is "2," the level of the "Index White" is set to "31" and the level of the "Index Black" is set to "2" in the two-dimensional matrix table 24, from which a single reference value, for example, "33" is derived. That is, both the high-luminance reference value m and the low-luminance reference value n are reflected in specifying the single reference value.

According to the control procedure illustrated in the present embodiment, even if the level ID value varies between, for example, as many as three levels of "28" to "31" at the high-luminance side, the level ID value varies by just one level from "1" to "2" at the low-luminance side, the diaphragm diameter of the iris diaphragm may be controlled not to change considerably. It is therefore prevented that the iris diaphragm 3 undergoes unnatural behavior to considerably change the luminance of the still generally dark-toned projected image.

Note that, if the level ID values of both the high-luminance side and the low-luminance side varied considerably, the iris diaphragm 3 may be controlled such that the diameter of the iris diaphragm may be changed considerably.

As described above, according to the projection display unit and the method for controlling the image display implemented by the projection display unit of the present embodiment, since the diaphragm diameter of the iris diaphragm is determined according to the luminance signal distribution in both the high-luminance end and the low-luminance end, the iris diaphragm may operate naturally according to the projected image to be displayed. For example, in a generally dark-toned image with a bright spot, which is considerably increased or decreased in size, the diaphragm diameter of the iris diaphragm 3 may be controlled not to change if the image still keeps a generally dark tone. Accordingly, the iris diaphragm 3 may be controlled automatically while eliminating unnatural behavior of the iris diaphragm 3, thereby appropriately controlling luminance of the projected image.

In the projection display unit and the method for controlling the image display implemented by the projection display unit according to the present embodiment, a series of control operations described above is implemented using the two-dimensional matrix table 24. Accordingly, the way to control the iris diaphragm 3 may be determined depending on the setup in the two-dimensional matrix table 24. Therefore, a high degree of freedom in the diaphragm control of the iris diaphragm 3 may be provided while eliminating unnatural behavior of the iris diaphragm 3. The two-dimensional matrix table 24 has to be set up in advance, but the setup detail may not necessarily be fixed. For example, the two-dimensional matrix table 24 may be rewritten in a predetermined operation.

In the two-dimensional matrix table 24, the reference value is provided in a two-dimensional array matrix so that a single reference value may be derived from the high-luminance reference value m and the low-luminance reference value n. Accordingly, the number of levels for a single reference value may be greater than those of the high-luminance reference value m and the low-luminance reference value n which may be specified by the histogram analyzer 22. In particular, as shown in FIG. 2, in contrast that the high-luminance reference value m and the low-luminance reference value n each has 32 levels of "0" to "31," a single reference value to be derived from these reference values may have, for example, 64 levels of "0" to "63." In this manner, if the single reference value has a greater number of levels than those of the high-luminance reference value m and the low-luminance reference value n, the iris diaphragm 3 may be controlled with higher resolution, thereby providing various embodiments of diaphragm control. This also helps appropriate control of the luminance of the projected image.

For example, the number of levels along the horizontal axis of the histogram or the number of levels of the high-luminance reference value m and the low-luminance reference value n which may be specified by the histogram analyzer 22 illustrated in the present embodiment are illustrative only and are not restrictive.

The same is also applied to the setup detail in the two-dimensional matrix table 24. It suffices that the two-dimensional matrix table 24 derives a single reference value from both the high-luminance reference value m and the low-luminance reference value n, and thus the detail of the setup values or the number of levels are not particularly limited.

The present embodiment has been illustrated with reference to a liquid crystal projector as a projection display unit that modulates light using a liquid crystal panel. The invention, however, may also be applied other projection display units, such as a graphic display device using a digital mirror device (DMD), so long as they have diaphragm control for the iris diaphragm.

It is to be understood that the foregoing description of the preferred embodiment of the invention is illustrative only and that various modification may be made without departing from the spirit and scope of the invention.

What is claimed is:

1. A projection display unit comprising:
a light modulation panel which modulates light from a light source in accordance with a given image signal;
an iris diaphragm which regulates, by changing a diaphragm diameter, a transmission amount of light modulated by the light modulation panel;
a histogram creator which creates a histogram of a luminance signal distribution of the image signal;
a histogram analyzer which analyzes the histogram created by the histogram creator to specify a high-luminance reference value and a low-luminance reference value in the histogram, wherein specifying the high-luminance reference value comprises cumulatively adding histogram values from the high-luminance end of the histogram one-by-one, comparing the sum of the luminance values, after each addition, to a high-luminance threshold, and when the sum exceeds the high-luminance threshold, setting the high-luminance reference value to a luminance level corresponding to the last added histogram value, and wherein specifying the low-luminance reference value comprises cumulatively adding histogram values from the low-luminance end of the histogram one-by-one, comparing the sum of the luminance values, after each addition, to a low-luminance threshold, and when the sum exceeds the low-luminance threshold, setting the low-luminance reference value to a luminance level corresponding to the last added histogram value;
a reference value derivation section which derives a single reference value from both the high-luminance reference value and the low-luminance reference value specified by the histogram analyzer; and
an iris controller which determines the diaphragm diameter of the iris diaphragm for the light modulated by the light modulation panel in accordance with the image signal on the basis of the single reference value specified by the reference value derivation section.

2. The projection display unit according to claim 1, further comprising a table holding section which holds a two-dimensional matrix table used for deriving the single reference value from both the high-luminance reference value and the low-luminance reference value, wherein the reference value derivation section derives the single reference value using the two-dimensional matrix table held by the table holding section.

3. The projection display unit according to claim 2, wherein the two-dimensional matrix table held by the table holding section has a greater number of levels for the single reference value than for the high-luminance reference value and the low-luminance reference value which may be specified by the histogram analyzer.

4. A method for controlling image display, the method comprising the steps of:
   modulating light from a light source in accordance with a given image signal;
   creating a histogram of a luminance signal distribution of the image signal;
   analyzing the created histogram to specify a high-luminance reference value and a low-luminance reference value in the histogram, wherein specifying the high-luminance reference value comprises cumulatively adding histogram values from the high-luminance end of the histogram one-by-one, comparing the sum of the luminance values, after each addition, to a high-luminance threshold, and when the sum exceeds the high-luminance threshold, setting the high-luminance reference value to a luminance level corresponding to the last added histogram value, and wherein specifying the low-luminance reference value comprises cumulatively adding histogram values from the low-luminance end of the histogram one-by-one, comparing the sum of the luminance values, after each addition, to a low-luminance threshold, and when the sum exceeds the low-luminance threshold, setting the low-luminance reference value to a luminance level corresponding to the last added histogram value;
   deriving a single reference value from both the specified high-luminance reference value and the specified low-luminance reference value; and
   regulating, by changing a diaphragm diameter, a transmission amount of the modulated light according to the image signal, the diaphragm diameter being determined on the basis of the derived single reference value.

* * * * *